(12) United States Patent
Hattori

(10) Patent No.: US 7,675,511 B2
(45) Date of Patent: Mar. 9, 2010

(54) ELECTRONIC NOTEBOOK

(75) Inventor: Yasuhiro Hattori, Cordova, TN (US)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 890 days.

(21) Appl. No.: 11/496,417

(22) Filed: Aug. 1, 2006

(65) Prior Publication Data
US 2006/0262257 A1     Nov. 23, 2006

Related U.S. Application Data

(63) Continuation-in-part of application No. PCT/JP2005/001495, filed on Feb. 2, 2005.

(30) Foreign Application Priority Data

Feb. 3, 2004    (JP)    ............... 2004-026609

(51) Int. Cl.
*G06F 3/38* (2006.01)
*G09G 3/34* (2006.01)
(52) U.S. Cl. .................. 345/204; 345/84; 345/85; 345/105; 345/107; 359/296
(58) Field of Classification Search ........... 345/84, 345/85, 105, 107, 204; 359/296
See application file for complete search history.

(56) References Cited

U.S. PATENT DOCUMENTS

| | | | |
|---|---|---|---|
| 4,143,103 A | 3/1979 | Sheridon | |
| 5,724,064 A * | 3/1998 | Stefik et al. | ............ 345/105 |
| 6,265,986 B1 | 7/2001 | Oka et al. | |
| 6,362,807 B1 | 3/2002 | Baba et al. | |
| 6,774,884 B2 | 8/2004 | Shimoda et al. | |
| 7,154,452 B2 | 12/2006 | Nakamura et al. | |
| 2002/0105600 A1 | 8/2002 | Shimoda et al. | |
| 2003/0020701 A1 | 1/2003 | Nakamura et al. | |

FOREIGN PATENT DOCUMENTS

| | | | |
|---|---|---|---|
| GB | 1578460 A | 11/1980 | |
| JP | S55-169452 U | 5/1979 | |

(Continued)

OTHER PUBLICATIONS

International Bureau of WIPO, International Preliminary Report on Patentability, Related Patent Application No. PCT/JP2005/001495 mailed Sep. 28, 2006.

*Primary Examiner*—Richard Hjerpe
*Assistant Examiner*—Andrew Schnirel
(74) *Attorney, Agent, or Firm*—Baker Botts L.L.P.

(57) ABSTRACT

An electronic notebook includes a case; a sheet-like display medium provided in the case, containing charged particles, and having a first surface and a second surface; a first electrode disposed on the case; and a second electrode disposed on the case. By changing a positional relationship between the display medium and the first electrode and the second electrode, the display medium and the first electrode and the second electrode take on either an arranged state in which the display medium is interposed between the first electrode and the second electrode so that the first surface of the display medium opposes the first electrode and the second surface of the display medium opposes the second electrode, or a non-arranged state that is a state other than the arranged state.

11 Claims, 8 Drawing Sheets

FOREIGN PATENT DOCUMENTS

| | | |
|---|---|---|
| JP | S55169452 | 12/1980 |
| JP | H04-113386 A | 4/1992 |
| JP | H04113386 | 4/1992 |
| JP | H10-048673 A | 2/1998 |
| JP | H1048673 | 2/1998 |
| JP | H10-250288 A | 9/1998 |
| JP | H10250288 | 9/1998 |
| JP | 2000-075805 A | 3/2000 |
| JP | 200075805 | 3/2000 |
| JP | 2000-132121 A | 5/2000 |
| JP | 2000132121 | 5/2000 |
| JP | 2001-027882 A | 1/2001 |
| JP | 200127882 | 1/2001 |
| JP | 2001-311931 A | 11/2001 |
| JP | 2001311931 | 11/2001 |
| JP | 2002-169190 A | 6/2002 |
| JP | 2002169190 | 6/2002 |
| JP | 2003-029671 A | 1/2003 |
| JP | 200329671 | 1/2003 |

* cited by examiner

ELECTRONIC NOTEBOOK

CROSS REFERENCE TO RELATED APPLICATIONS

This application is a continuation-in-part of PCT/JP2005/001495 of an international application designating the United States of America filed on Feb. 2, 2005 (international filing date), and further claims priority based on 35 U.S.C section 119 to Japanese Patent Application No. 2004-026609 filed Feb. 3, 2004.

TECHNICAL FIELD

The present invention relates to an electronic notebook.

BACKGROUND

In an electronic paper well known in the art, an electric field is applied to charged color particles, causing the particles to move in order to display an image. One technology that employs this electronic paper is called an electronic notebook in which a plurality of sheets of the electronic paper is bound in a notebook format, as disclosed in U.S. Pat. No. 6,124,851.

The electronic paper employed in the electronic notebook includes a film containing two types of charged particles having a different color depending on the polarity of the charge; a first substrate having a first electrode; and a second substrate having a second electrode. The electronic paper is integrally formed by interposing the film between the first and second substrates in a sandwiched arrangement.

With electronic paper having this configuration, when an electric field is applied to the charged particles via the first and second electrodes, particles charged with the opposite polarity from the first electrode are attracted to the first electrode side, while particles charged with the opposite polarity from the second electrode are attracted to the second electrode.

Hence, by controlling the direction of the electric field applied to the charged particles, it is possible to control the movement of the charged particles in the electronic paper and to form images through the contrasting colors contained in the particles.

An electronic notebook includes a plurality of sheets of this electronic paper bound in a notebook form, facilitating the management of the sheets of electronic paper much like a normal notebook including a plurality of bound sheets of paper.

SUMMARY

However, this conventional electronic paper cannot be treated like paper due to its integrated structure including the film, first substrate, and second substrate. Further, forming electrodes on each sheet of the electronic paper leads to mounting costs in the electrode material and extra labor in the process of forming the electrodes, resulting in increased costs for manufacturing the electronic notebook.

In order to overcome the problems described above, it is an object of the present invention to provide an electronic notebook that can be treated like ordinary paper and that can be manufactured at a reduced cost.

In order to attain these objects, the present invention provides an electronic notebook including a case; a sheet-like display medium provided in the case, containing charged particles, and having a first surface and a second surface; a first electrode disposed on the case; and a second electrode disposed on the case. By changing a positional relationship between the display medium and the first electrode and the second electrode, the display medium and the first electrode and the second electrode take on either an arranged state in which the display medium is interposed between the first electrode and the second electrode so that the first surface of the display medium opposes the first electrode and the second surface of the display medium opposes the second electrode, or a non-arranged state that is a state other than the arranged state.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

Figure 1:
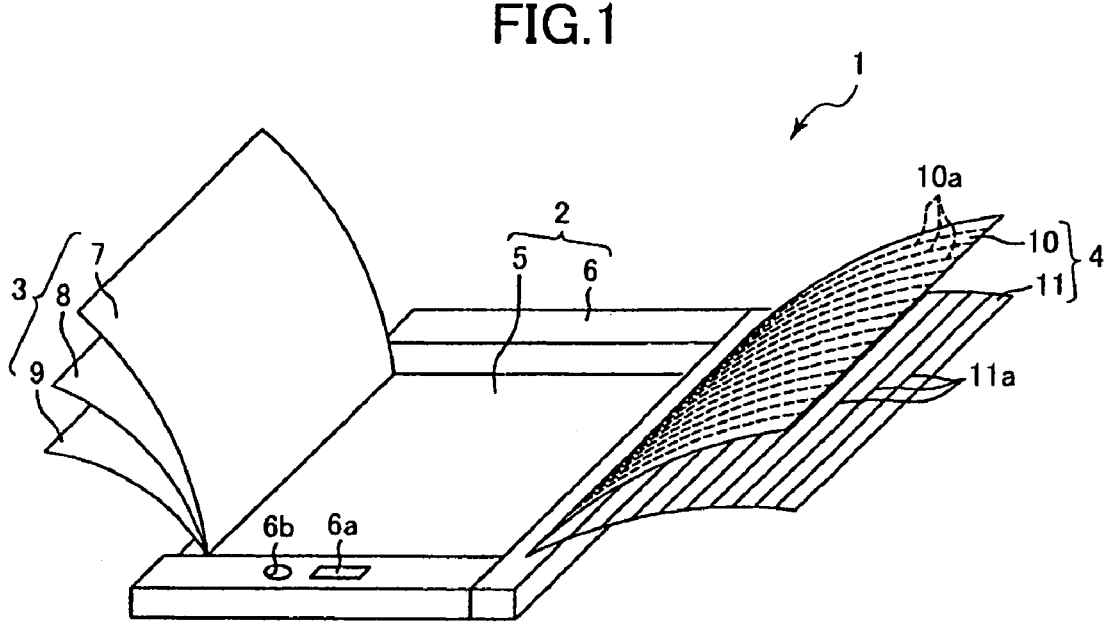
FIG. 1 is a perspective view of an electronic notebook according to a first embodiment of the present invention.

An electric notebook according to preferred embodiments of the present invention will be described while referring to the accompanying drawings wherein like parts and components are designated by the same reference numerals to avoid duplicating description.

In the following description, the expressions "front", "rear", "upper", "lower", "right", and "left" are used to define the various parts when the electric notebook is disposed in an orientation in which it is intended to be used.

Next, preferred embodiments of the present invention will be described while referring to the accompanying drawings. FIG. 1 is a perspective view of an electronic notebook 1 according to a first embodiment of the present invention. The electronic notebook 1 displays images by applying an electric field to charged, colored particles in order to move the particles. The electronic notebook 1 includes a support case 2, a display media set 3, and an electrode member 4. The support case 2 has a rectangular shape and supports both the display media set 3 and the electrode member 4. The display media set 3 is mounted on one edge of the support case 2 (the edge on the left in FIG. 1), while the electrode member 4 is mounted on another edge of the support case 2 (the edge on the right in FIG. 1).

The support case 2 is configured of a rectangular base plate 5, and a frame 6 mounted along the peripheral edges of the base plate 5.

The base plate 5 supports the entire electronic notebook 1. The base plate 5 includes a fastener, not shown in the drawing, on the edge on which the display media set 3 is mounted for supporting the edge of the display media set 3 similar to the pages in a notebook. The base plate 5 is formed slightly larger than the display media set 3 and electrode member 4 so that the display media set 3 and electrode member 4 can be stacked on top of the base plate 5.

The frame 6 includes another fastener, not shown in the drawings, on an edge opposite the side of the support case 2 on which the display media set 3 is supported for supporting the electrode member 4 like pages of a notebook. A control unit 25 (see FIG. 4) is built into the frame 6 for controlling electric signals applied to electrodes formed on the electrode member 4. The frame 6 is thicker than the base plate 5 in order to have sufficient space for accommodating the control unit 25.

On the surface of the frame 6 are further provided a pushbutton-type power switch 6a, and a connector 6b. The power switch 6a is managed by a CPU 26 (see FIG. 4) included in the control unit 25. When the CPU 26 detects that the power switch 6a has been pushed, the CPU 26 supplies power to electrode member 4. The connector 6b is connected to an external device via a cable and receives data inputted from the external device for displaying an image on the display media set 3.

The display media set 3 is configured of three flexible sheet-like display media 7, 8, and 9. However, the number of sheets of display media is not limited to three sheets, provided there is at least one sheet. Each of the display media 7, 8, and 9 contains charged particles. The charged particles can be moved by applying an electric field from the electrode member 4 to display an image on the display media 7, 8, and 9. The image can be rewritten by reapplying an electric field. The structure of the display media 7, 8, and 9 are described in greater detail below.

The electrode member 4 is provided separately from the display media set 3 and is configured of a sheet-like first substrate 10, and a sheet-like second substrate 11. The electrode member 4 is preferably formed of a polyester film, such as polyethylene, polypropylene, polyamide, polyimide, polyphenylene sulfide, and polyethylene terephthalate (PET). However, PET is most preferable of these due to its low cost and high strength. The thickness of the electrode member 4 is preferably between 0.025 and 0.3 mm, and most preferably between 0.05 and 0.1 mm.

First electrodes 10a are formed on the surface of the first substrate 10 opposing the second substrate 11, and second electrodes 11a are formed on the surface of the second substrate 11 opposing the first substrate 10. The first electrodes 10a and second electrodes 11a are formed through vapor deposition or sputtering, preferably using a metal such as gold, silver, copper, or aluminum; an indium oxide, tin oxide, indium tin oxide (ITO), or an electrically conductive synthetic resin material. An electric field is applied to the charged particles contained in the display media 7, 8, and 9 via the first electrodes 10a and second electrodes 11a.

The first electrodes 10a are formed in a plurality of lines running in a first direction on the first substrate 10 (indicated by dotted lines in FIG. 1). The first electrodes 10a are indicated with dotted lines in FIG. 1 since the view in FIG. 1 shows the surface on the opposite side from which the first electrodes 10a are formed. However, the first electrodes 10a are actually formed in continuous lines, as described above, and not broken lines. The second electrodes 11a are formed in a plurality of lines running in a second direction substantially orthogonal to the first direction on the second substrate 11.

By forming the first electrodes 10a on the first substrate 10 and the second electrodes 11a on the second substrate 11 in this way, a plurality of points are formed by the intersecting first electrodes 10a and second electrodes 11a when the first substrate 10 and second substrate 11 are superposed.

When any one of the display media 7, 8, and 9 is interposed between the first substrate 10 and second substrate 11 and an electric field is applied to the charged particles contained in the interposed display media 7, 8, and 9 via the first electrodes 10a and second electrodes 11a, the particles separately migrate toward the first electrodes 10a and second electrodes 11a according to the polarity of charge. When a plurality of particles moves near the surface of the display medium 7, 8, or 9, the contrasting colors in the plurality of particles produces a desired image on the display medium 7, 8, or 9.

By providing the first electrodes 10a and second electrodes 11a separate from the display media 7, 8, and 9, the electronic notebook 1 of the preferred embodiment can be configured thinner than a conventional electronic notebook in which the first electrodes 10a and second electrodes 11a are integrally incorporated in the display media. Hence, each of the display media 7, 8, and 9 can have flexibility similar to actual paper so that the display media set 3 can be given a quality that approaches the quality of a normal notebook. Further, eliminating the need to form electrodes on each of the display media 7, 8, and 9 can reduce the cost required for the electrode material and simplify the electrode forming process, thereby reducing the overall manufacturing costs.

Each the display media 7, 8, and 9 is disposed between the first and second electrodes 10a, 11a so that a different image can be displayed on each display media 7, 8, and 9. Further, since the first and second electrodes 10a, 11a are used commonly for displaying images on a plurality of the display media 7, 8, and 9, there is no need to form electrodes on the display media. Hence, this construction reduces the cost of the electrode material and simplifies the process for forming the electrodes, resulting in an overall reduced manufacturing cost.

The frame 6 can bind the plurality of display media 7, 8, and 9 much like an ordinary notebook, thereby facilitating a reader in browsing the material and the like when a large amount of information is displayed over a plurality of the display media 7, 8, and 9.

By forming the first and second substrates 10, 11 in a sheet form, this construction can produce an overall thin electronic notebook 1. Further, since the display media 7, 8, and 9 can be sandwiched by the first and second substrates 10, 11 such that the particles contained in the display media 7, 8, and 9 are interposed between the first and second electrodes 10a, 11a, an electric field can easily be applied to the display media 7, 8, and 9.

Figure 2A:
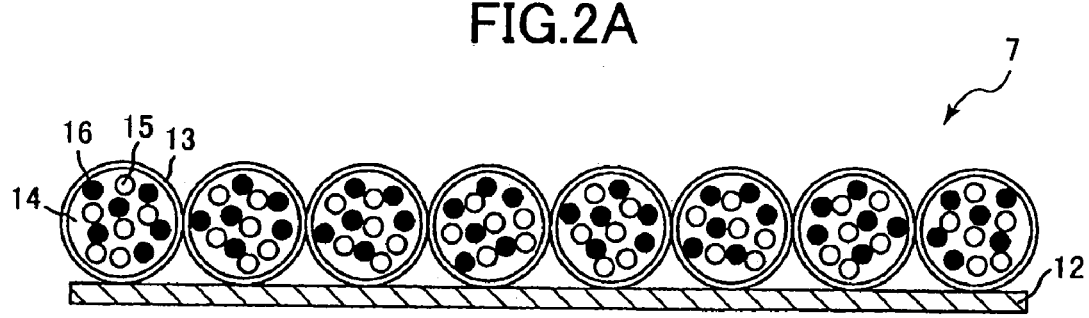
FIG. 2A is a cross-sectional view of a display medium.

Since the display media 7, 8, and 9 and electrodes 10a, 11a can be separated, it is possible to carry the display medium 7, 8, and 9 by itself in order to reduce the space needed for accommodating the display media 7, 8, and 9. Further, if a malfunction occurs in the display media 7, 8, and 9 or the electrodes 10a, 11a, only the malfunctioning part need be removed and replaced, making the electronic notebook 1 more economical FIG. 2A is a cross-sectional view showing the display medium 7. The other display media 8 and 9 are configured identical to the display medium 7. The display medium 7 is configured of a flexible sheet-like film 12, and spherical capsules 13 arranged densely on top of the film 12. The capsules 13 are colorless and transparent and are fixed to the film 12 by an adhesive, such as acrylic resin or an aqueous polymeric substance such as polyvinyl alcohol.

The film 12 is preferably configured of a polyester film formed of polyethylene, polypropylene, polyamide, polyimide, polyphenylene sulfide, or PET, for example, and is most preferably formed of PET due to its low cost and high strength. Further, the film 12 has a thickness of between 0.025 and 0.3 mm, and most preferably between 0.05 and 0.1 mm.

Each capsule 13 is filled with an insulating dispersion fluid 14 that is colorless and transparent. Within the dispersion fluid 14 are dispersed white charged particles 15 having a positive charge and black charged particles 16 having a negative charge, as the charged particles described above.

Figure 2B:
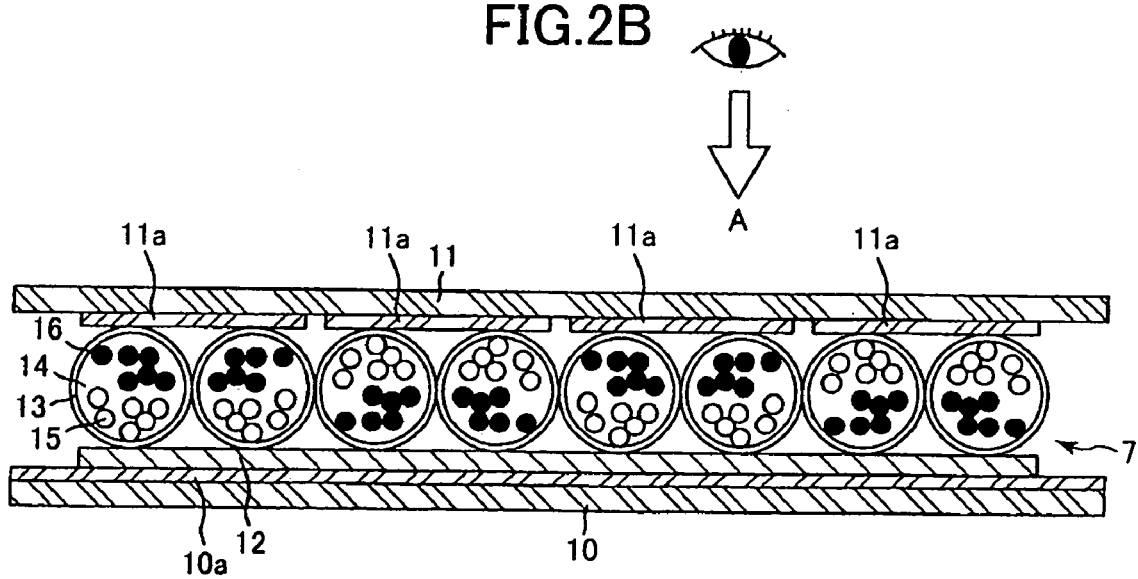
FIG. 2B is a cross-sectional view of the display medium interposed between first and second substrates.

FIG. 2B is a cross-sectional view along a direction parallel to the longitudinal direction of the first electrodes 10a showing the display medium 7 interposed between the first substrate 10 and second substrate 11. In the drawing, the second electrodes 11a are depicted as four lines for purposes of description. Further, while the drawing depicts two capsules 13 corresponding to each line of the second electrodes 11a in the preferred embodiment, the number of capsules 13 corresponding to each line of the electrode is not limited to two.

As shown in FIG. 2B, with the display medium 7 interposed between the first substrate 10 and second substrate 11, a negative voltage is applied to the first electrodes 10a and a positive voltage to the first and third second electrodes 11a from left to right in FIG. 2B. Hence, the positively charged white charged particles 15 in capsules 13 interposed between the first electrodes 10a and the first and third second electrodes 11a are attracted to the first electrodes 10a side, while the negatively charged black charged particles 16 in the same capsules 13 are attracted to the second electrodes 11a side. Accordingly, the black charged particles 16 in these capsules 13 conceal the white charged particles 15 when viewed from above the second substrate 11 (in the direction indicated by an arrow A) in areas where the black charged particles 16 are attracted to the second electrodes 11a side. Hence, the black color of the black charged particles 16 is seen from a viewpoint above the second substrate 11 (according to the arrow A).

Further, when applying a positive voltage to the first electrodes 10a and a negative voltage to the second and fourth second electrodes 11a in the direction from left to right in FIG. 2B, the positively charged white charged particles 15 in the capsules 13 interposed between the first electrodes 10a and the second and fourth second electrodes 11a are attracted to the second electrodes 11a, while the negatively charged black charged particles 16 in the same capsules 13 are attracted to the first electrodes 10a side. Hence, the white charged particles 15 now cover the black charged particles 16 in this case when viewed above the second substrate 11 (in the direction of the arrow A) in areas that the white charged particles 15 are attracted to the second electrodes 11a side so that the white color of the white charged particles 15 appears to the viewer above the second substrate 11 (viewing in the direction of the arrow A).

As another example, the same results described above can be obtained by applying a voltage of 0 V to the first electrodes 10a, that is by grounding the first electrodes 10a, and applying a positive voltage to the first and third second electrodes 11a in order from the left in FIG. 2B and a negative voltage to the second and fourth second electrodes 11a in order from the left in FIG. 2B.

Hence, by controlling the polarity of the first electrodes 10a and second electrodes 11a forming desired lines to regulate the migration of the colored charged particles 15 and 16, it is possible to form an image on the display medium 7 through the contrast of the white charged particles 15 and black charged particles 16. By modifying the number of intersecting points, that is the number of electrodes 10a, 11a, based on the required image quality, it is possible to eliminate unnecessary electrodes 10a, 11a and reduce the cost of the electrode material. In other words, the number of line electrodes 10a, 11a may be increased when high-quality images are required and decreased when high-quality images are unnecessary.

Figure 3A:
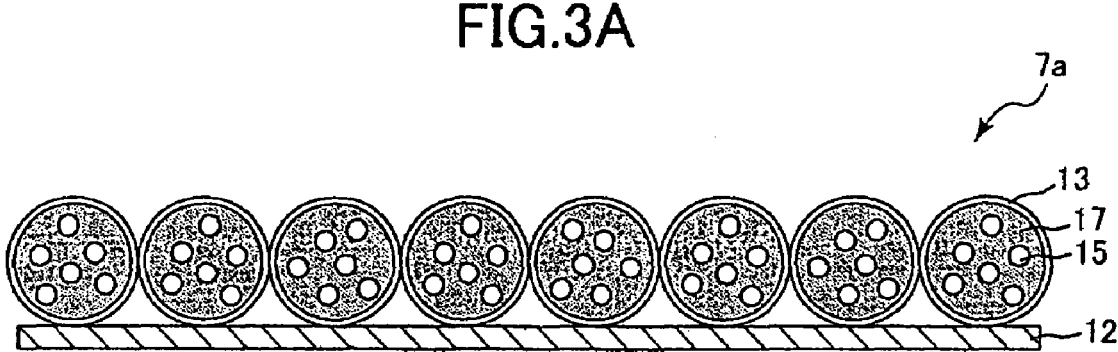
FIGS. 3A-C are cross-sectional views of other display media.
Figure 3B:
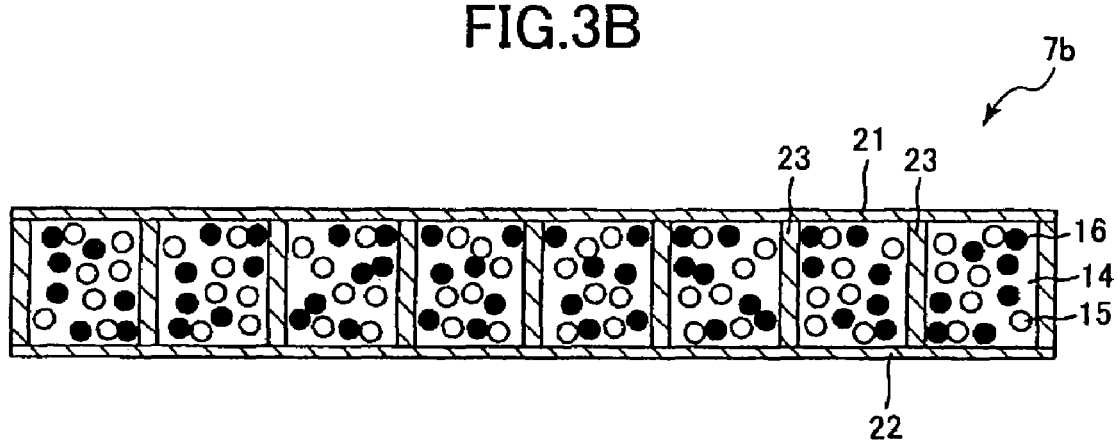
Figure 3C:
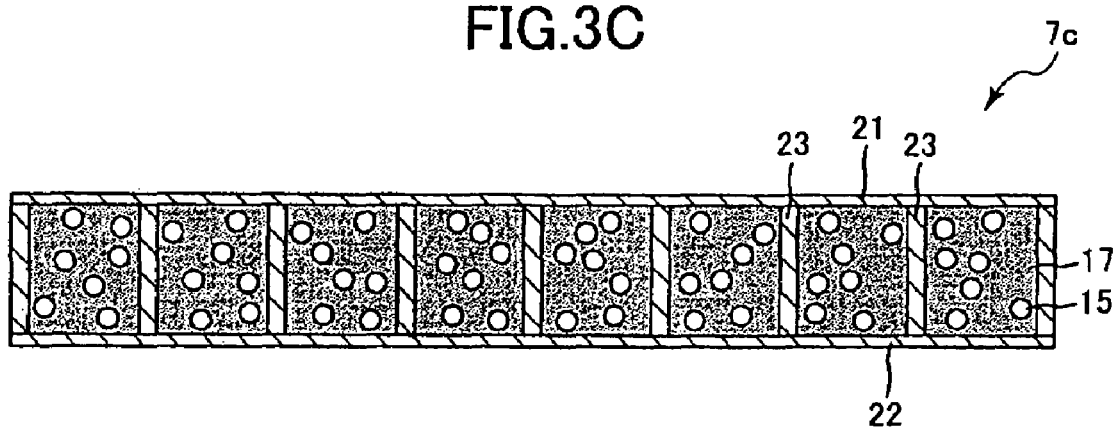

FIGS. 3A-C are cross-sectional views showing alternate examples of the display medium 7, wherein like parts and components in the display medium 7 described in FIG. 2A are designated with the same reference numerals to avoid duplicating description.

In a display medium 7a shown in FIG. 3A, each capsule 13 is filled with an insulating dispersion fluid 17 that is black in color. Positively charged white charged particles 15 are dispersed in the dispersion fluid 17.

When the display medium 7a having this construction is interposed between the first substrate 10 and second substrate 11, as described above, and a positive voltage is applied to the first electrodes 10a and a negative voltage to the second electrodes 11a, the white charged particles 15 migrate toward the second electrodes 11a side. As a result, the white charged particles 15 cover the black colored dispersion fluid 17 and the white color of the white charged particles 15 appears on the surface of the display medium 7a.

In contrast, when applying a negative voltage to the first electrodes 10a and a positive voltage to the second electrodes 11a, the white charged particles 15 migrate to the first electrodes 10a side. As a result, the white charged particles 15 are submerged in the black dispersion fluid 17 so that the black color of the dispersion fluid 17 appears on the surface.

As with the display medium 7 in FIG. 2A, the display medium 7a can also display images through the contrasting colors of the dispersion fluid 17 and the white charged particles 15.

A display medium 7b shown in FIG. 3B and a display medium 7c shown in FIG. 3C include two flexible films 21 and 22 disposed in confrontation over a prescribed distance, and partitioning walls 23 partitioning the space between the films 21 and 22 into cells. In place of the capsules 13 described above, each of these cells is filled with a dispersion fluid. Like the film 12, the films 21 and 22 are preferably formed of PET having a thickness of 0.05-0.1 mm.

As with the display medium 7 shown in FIG. 2A, each cell in the display medium 7b shown in FIG. 3B is filled with the insulating dispersion fluid 14 that is colorless and transparent, and the dispersion fluid 14 contains positively charged white charged particles 15 and negatively charged black charged particles 16.

As in display medium 7a shown in FIG. 3A, each cell in the display medium 7c of FIG. 3C is filled with the black insulating dispersion fluid 17, and the dispersion fluid 17 includes positively charged white charged particles 15.

Hence, the display medium 7a, 7b, or 7c may be used in place of the display medium 7 to display images similar to those obtained when using the display medium 7.

Figure 4:
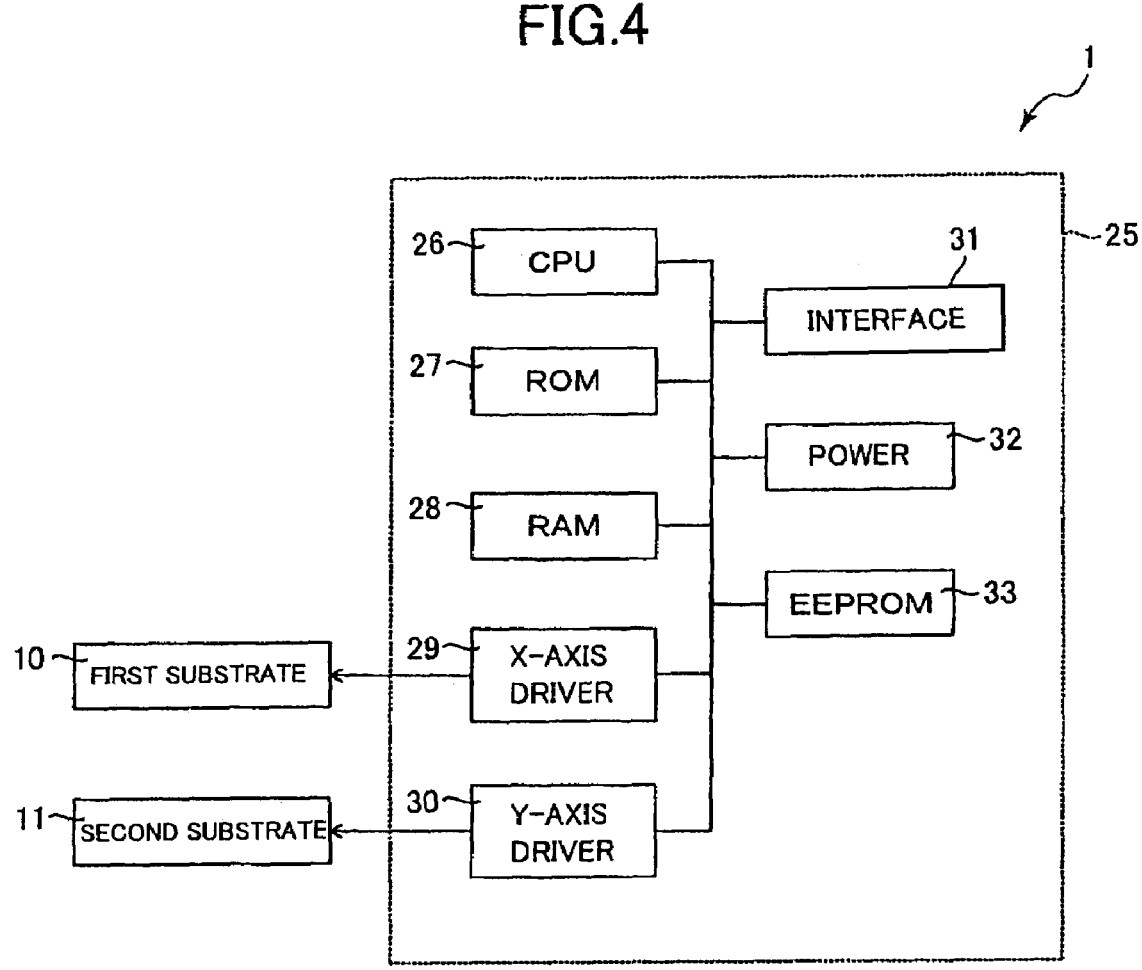
FIG. 4 is a block diagram illustrating the electrical structure of the electronic notebook.

FIG. 4 is a block diagram showing the electrical structure of the electronic notebook 1. The control unit 25 built into the frame 6 includes the CPU 26, a ROM 27, a RAM 28, an X-axis display driver 29, a Y-axis display driver 30, an interface 31, a power supply 32, and an EEPROM 33.

The CPU 26 is a computational device for executing control programs stored in the ROM 27. The ROM 27 is a nonvolatile and non-rewritable memory device functioning to store control programs executed by the CPU 26. These control programs provide instructions for applying electric signals to the first electrodes 10a and second electrodes 11a in order to display images on the display media 7, 8, and 9 based on image data stored in the EEPROM 33. The RAM 28 is a volatile memory for temporary storing data used by the CPU 26 when the CPU 26 executes the control programs stored in the ROM 27.

The X-axis display driver 29 applies electric signals to the first electrodes 10a for forming desired lines among the plurality of lines formed on the first substrate 10. The Y-axis display driver 30 applies electric signals to the second electrodes 11a for forming desired lines among the plurality of lines formed on the second substrate 11. The interface 31 includes the connector 6b (see FIG. 1) and functions to receive image data from an external device to be displayed on the display media 7, 8, and 9. The power supply 32 includes the power switch 6a (see FIG. 1) and functions to supply power required for running the electronic notebook 1. The EEPROM 33 is a rewritable memory for storing data received via the interface 31. The EEPROM 33 is a nonvolatile memory and, hence, retains stored data, even when the power is turned off.

Figure 5:
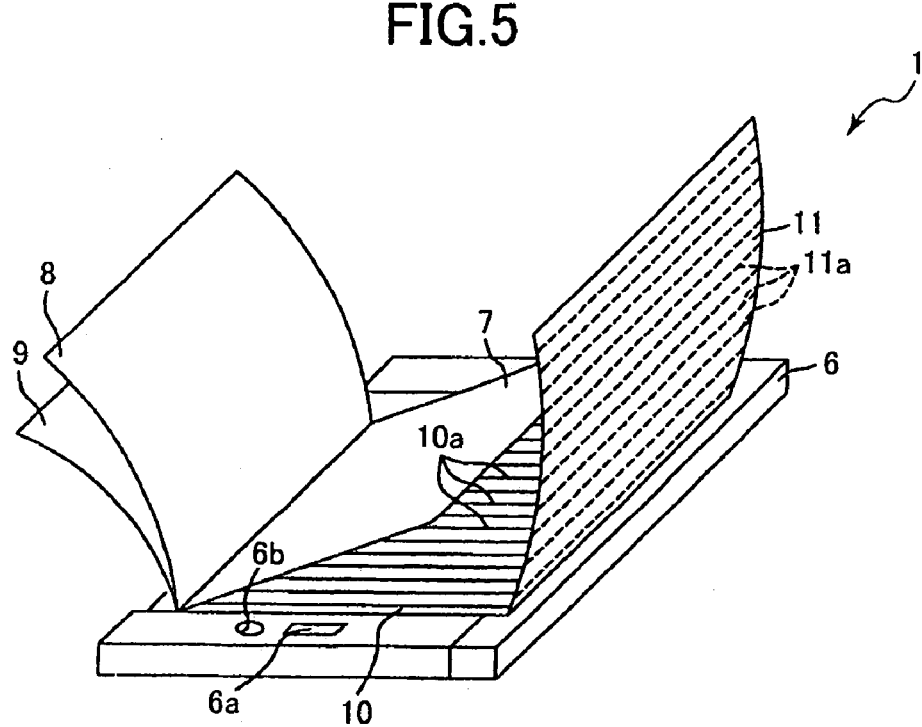
FIG. 5 is an explanatory diagram illustrating a method of using the electronic notebook according to the first embodiment.

FIG. 5 illustrates a method for using the electronic notebook 1. Let us consider an example for displaying a desired image on the display medium 7. First, the first substrate 10 is laid on top of the base plate 5. Next, the display medium 7 is stacked on the first substrate 10, and the second substrate 11 is stacked on top of the display medium 7.

Since the first substrate 10 and second substrate 11 are supported on the frame 6 as leafs of a notebook, these substrates can be properly arranged without mistaking the stacking order. Hence, it is possible to prevent the first and second substrates 10, 11 from being arranged in positions different from the arranged position according to design. Thus, it is possible to prevent the display of incorrect images and to avoid factors that can lead to malfunction.

In this way, the display medium 7 is interposed between the first substrate 10 and second substrate 11, and the intersecting first electrodes 10a and second electrodes 11a form a plurality of points on the display medium 7.

When the control unit 25 applies electric signals to prescribed first electrodes 10a and second electrodes 11a in this state, the white charged particles 15 and black charged particles 16 in the capsules 13 interposed between these first electrodes 10a and second electrodes 11a separately migrate toward the first electrodes 10a side and second electrodes 11a side.

In this way, it is possible to display images through the white and black contrast appearing on the surface of the display medium 7. Further, by scanning the lines to which voltage is applied and reversing the polarity applied to the first electrodes 10a and second electrodes 11a, it is possible to rewrite the image displayed on the display medium 7. Further, since the white charged particles 15 and black charged particles 16 maintain their state even when the power source is cut off, the displayed image is also maintained after the power source is cut off.

In order to display a desired image on the display medium 8, the display medium 7 can be placed over the base plate 5, after which the first substrate 10, display medium 8, and second substrate 11 can be stacked in order on top of the display medium 7, as described above, so that the display medium 8 is interposed between the first substrate 10 and second substrate 11.

Figure 6:
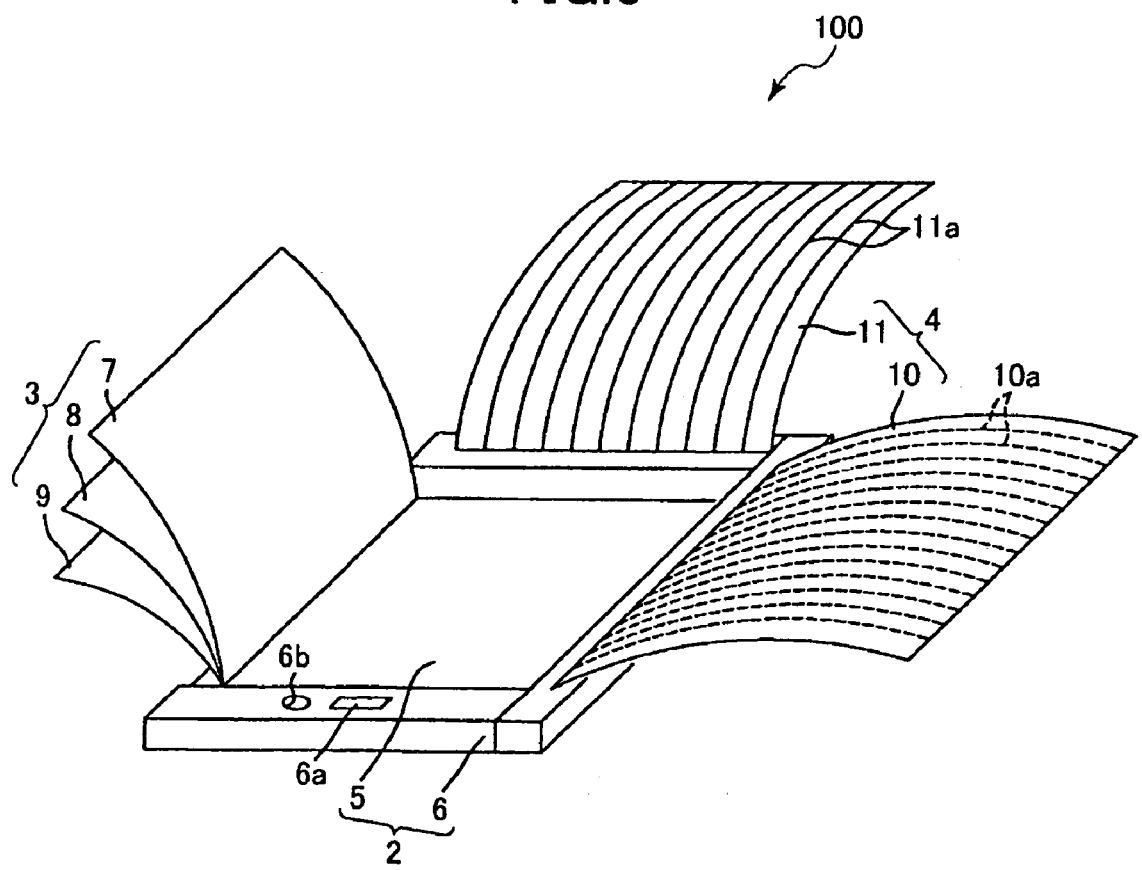
FIG. 6 is a perspective view of an electronic notebook according to a second embodiment.
Figure 7A:
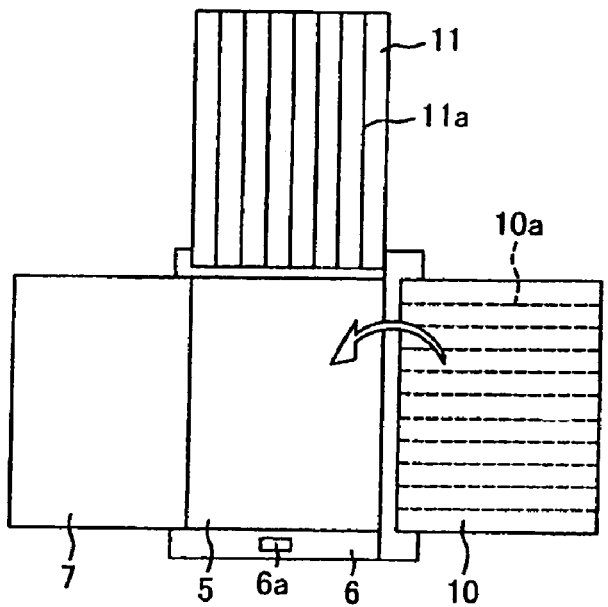
FIGS. 7A-D are explanatory diagrams illustrating a method of using the electronic notebook according to the second embodiment.
Figure 7B:
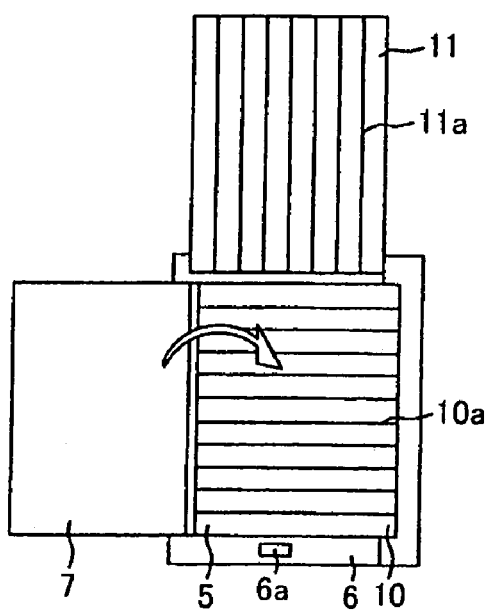
Figure 7C:
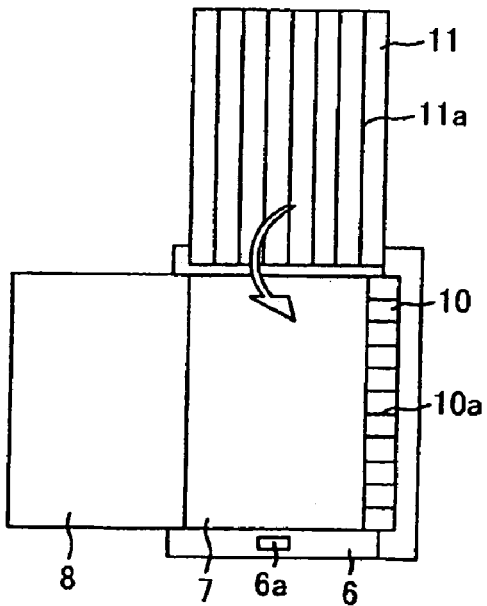
Figure 7D:
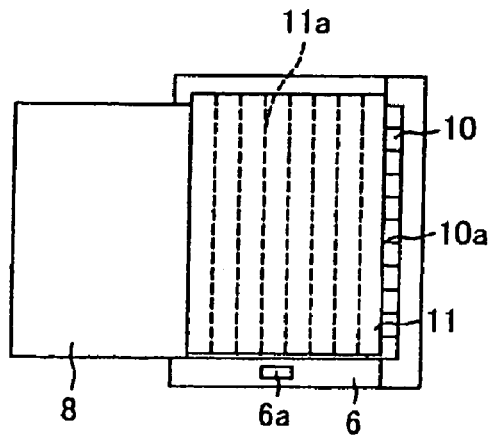

FIG. 6 is a perspective view showing an electronic notebook 100 according to a second embodiment of the present invention, wherein like parts and components are designated with the same reference numerals to avoid duplicating description.

The electronic notebook 100 according to the second embodiment differs from the electronic notebook 1 according to the first embodiment in the position for supporting the second substrate 11.

Specifically, in the electronic notebook 1 according to the first embodiment, the edges of the first substrate 10 and second substrate 11 are supported along the same side of the frame 6 in the style of a notebook. However, in the electronic notebook 100 according to the second embodiment, the edges of the first substrate 10 and second substrate 11 are supported along different sides of the frame 6.

Next, the electronic notebook 100 according to the second embodiment will be described. In the electronic notebook 100, the X-axis display driver 29 and Y-axis display driver 30 are disposed separately in the control unit 25 described above. More specifically, the X-axis display driver 29 is built into the frame 6 along the side supporting the first substrate 10, while the Y-axis display driver 30 is built into the frame 6 along the side supporting the second substrate 11.

By disposing the X-axis display driver 29 and Y-axis display driver 30 in different locations in this way, the size of the frame 6 can be formed more balanced than when the X-axis display driver 29 and Y-axis display driver 30 are disposed in the same location. Accordingly, the overall thickness of the frame 6 can be reduced.

FIG. 7 illustrates the method of using the electronic notebook 100 according to the second embodiment. In order to display a prescribed image on the display medium 7, for example, the first substrate 10 is first placed over the base plate 5, as shown in FIG. 7A. Next, the display medium 7 is placed on top of the first substrate 10, as shown in FIG. 7B. Next, the second substrate 11 is placed on top of the display medium 7, as shown in FIG. 7C. In this way, the display medium 7 is interposed between the first substrate 10 and second substrate 11, as illustrated in FIG. 7D.

By applying a voltage across the first electrodes 10a and second electrodes 11a in this state, the white charged particles 15 and black charged particles 16 interposed between the electrodes migrate to display a rewritable image on the display medium 7, as described with the electronic notebook 1 in the first embodiment.

Figure 8A:
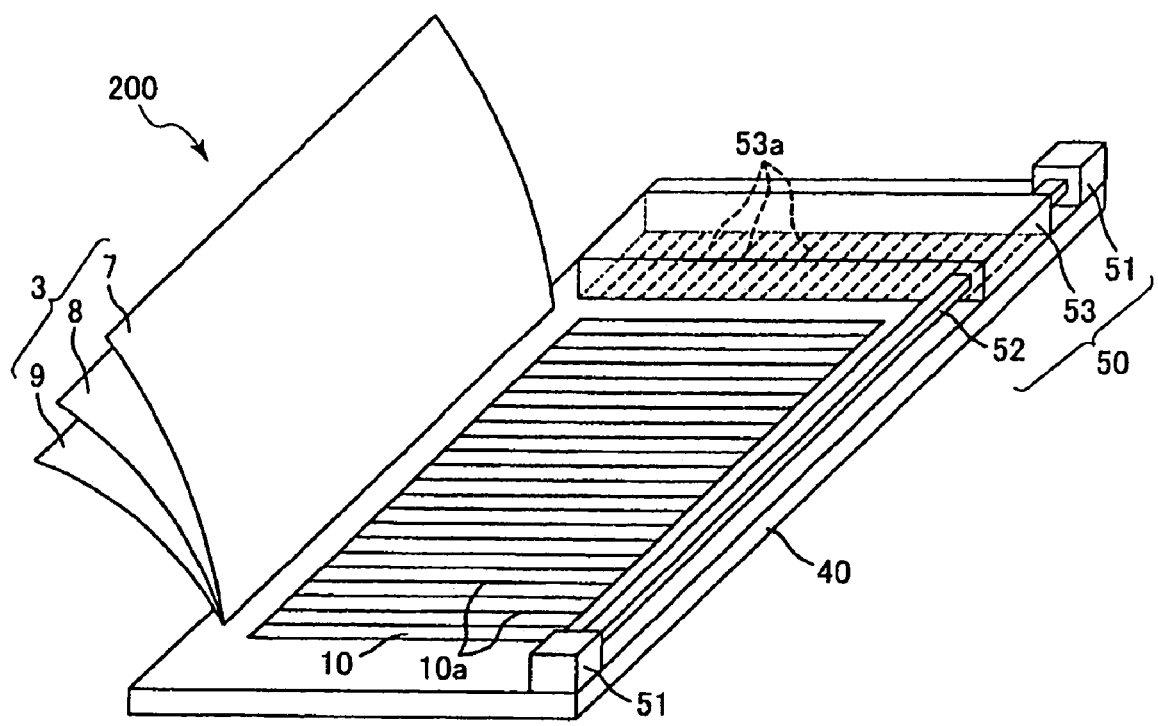
FIG. 8A is a perspective view of an electronic notebook according to a third embodiment of the present invention.

Next, an electronic notebook 200 according to a third embodiment of the present invention will be described. FIG. 8A is a perspective view showing the electronic notebook 200, wherein like parts and components are designated with the same reference numerals to avoid duplicating description.

The electronic notebook 200 according to the third embodiment includes a rectangular support substrate 40, a head unit 50, the display media set 3, and the first substrate 10. The head unit 50 includes a head member 53, two support blocks 51, and a guiding rod 52. The head member 53 functions to replace the second substrate 11 in the electronic notebook 1 and electronic notebook 100 of the first and second embodiments described above. The head member 53 has second electrodes 53a formed on a surface opposing the display media 7, 8, and 9 stacked on the first substrate 10.

The support blocks 51 are erected from corners of the support substrate 40 on the side opposite the side binding the display media set 3. The guiding rod 52 spans between the two support blocks 51. The head member 53 is mounted on the guiding rod 52 so as to be able to reciprocate along the guiding rod 52. Hence, the head member 53 is capable of moving relative to the display media 7, 8, and 9.

One edge of the first substrate 10 is supported on a side of the support substrate 40 different from a side on which the display media set 3 is supported in the style of a notebook, so that the first substrate 10 can be turned over in a direction different from the display media set 3. The first substrate 10 may also be integrally formed on the support substrate 40 rather than being supported at an end.

The support substrate 40 is formed longer than the display media 7, 8, and 9 and the first substrate 10 in the reciprocating direction of the head member 53. The portion of the support substrate 40 extending farther than the display media 7, 8, and 9 serves as a standby position for the head member 53. When in the standby position, the head member 53 does not overlap the display media 7, 8, and 9 or the first substrate 10 positioned on the support substrate 40.

Figure 8B:
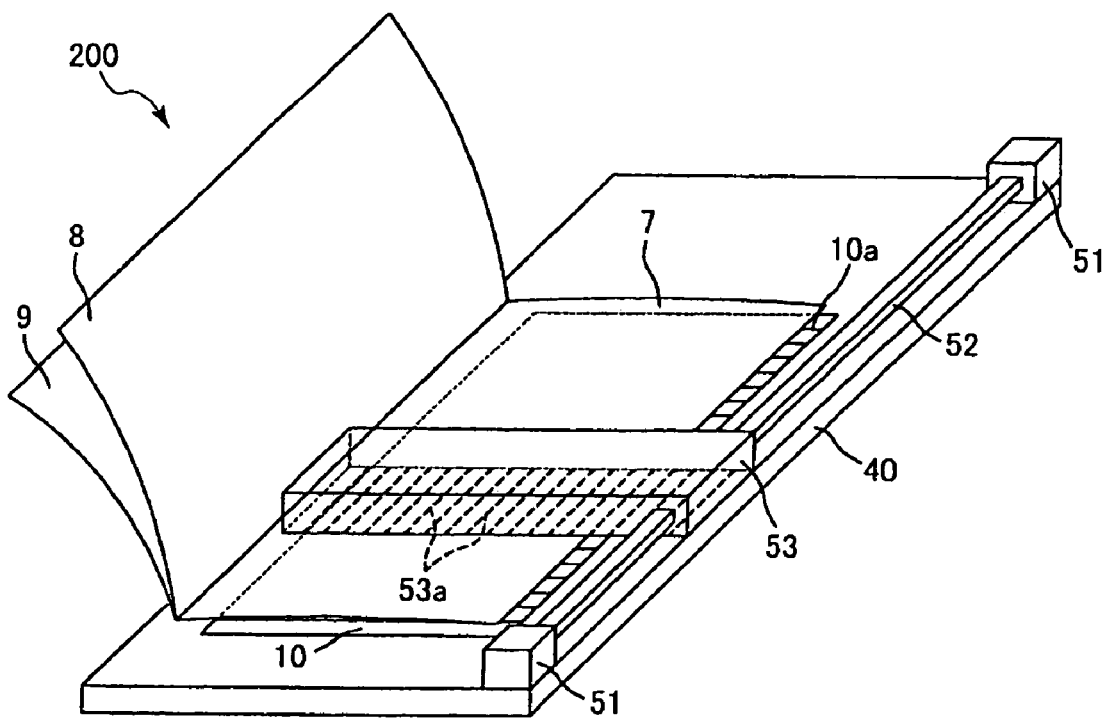
FIG. 8B is an explanatory diagram illustrating a method of using the electronic notebook according to the third embodiment.

FIG. 8B illustrates a method of using the electronic notebook 200 according to the third embodiment. Let us consider a case of forming a desired image on the display medium 7 using the electronic notebook 200. As shown in FIG. 8B, the head member 53 is first placed in the standby position on the support substrate 40. In this state, the first substrate 10 is placed over the support substrate 40, after which the display medium 7 is stacked on top of the first substrate 10. The head member 53 is subsequently moved from the standby position along the guiding rod 52 to a position over the display medium 7.

At this time, a portion of the display medium 7 is interposed between the first substrate 10 and the head member 53. By applying a voltage across the first electrodes 10a formed on the first substrate 10 and the second electrodes 53a formed on the head member 53 in this state, the white charged particles 15 and black charged particles 16 interposed between these electrodes migrate, as described with the electronic notebook 1 in the first embodiment, to display an image in the region of the display medium 7 interposed between the electrodes. By moving the head member 53 across the entire surface of the display medium 7, it is possible to display an image on the entire display medium 7.

In the electronic notebook 200 according to the third embodiment described above, the head member 53 has greater rigidity than the second substrate 11 described in the first and second embodiments. Hence, the surfaces of the second electrodes 53a can be formed with a substantially uniform flatness, thereby maintaining a substantially uniform gap between the second electrodes 53a and the display media. Accordingly, a substantially uniform electric field can be applied to the display media, enabling the formation of high-quality images. Further, since the second electrodes 53a are formed over a smaller surface, it is possible to reduce the cost required for the electrode material.

Figure 9A:
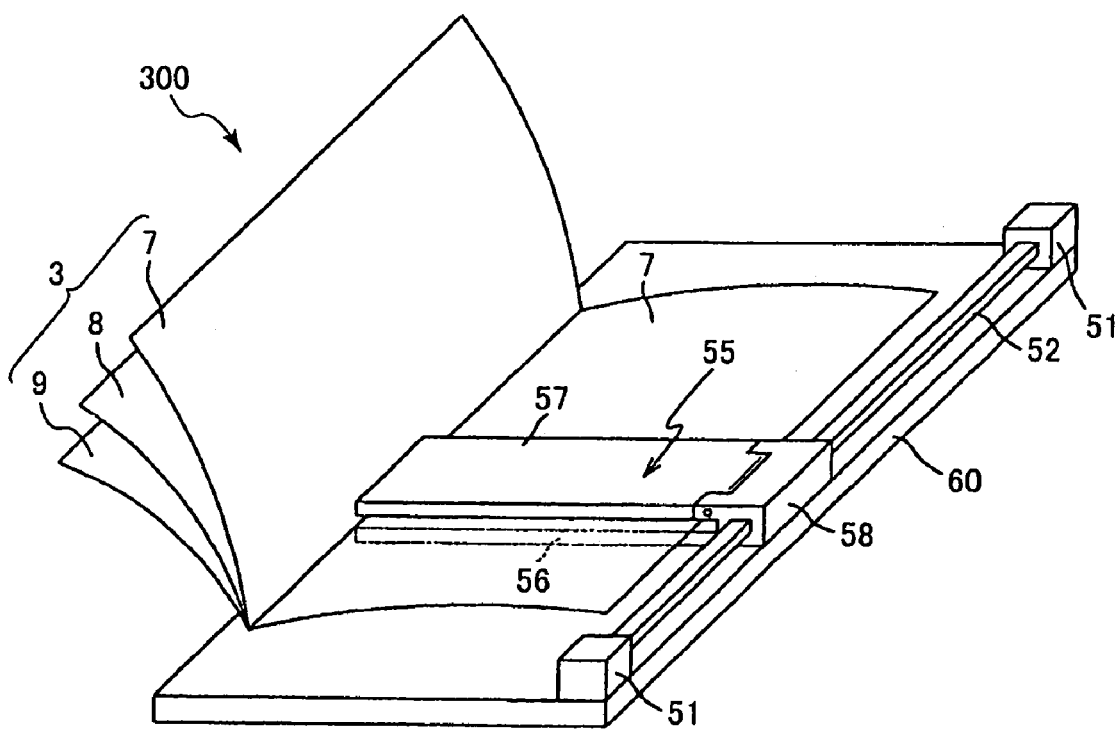
FIG. 9A is a perspective view of an electronic notebook according to a fourth embodiment of the present invention.
Figure 9B:
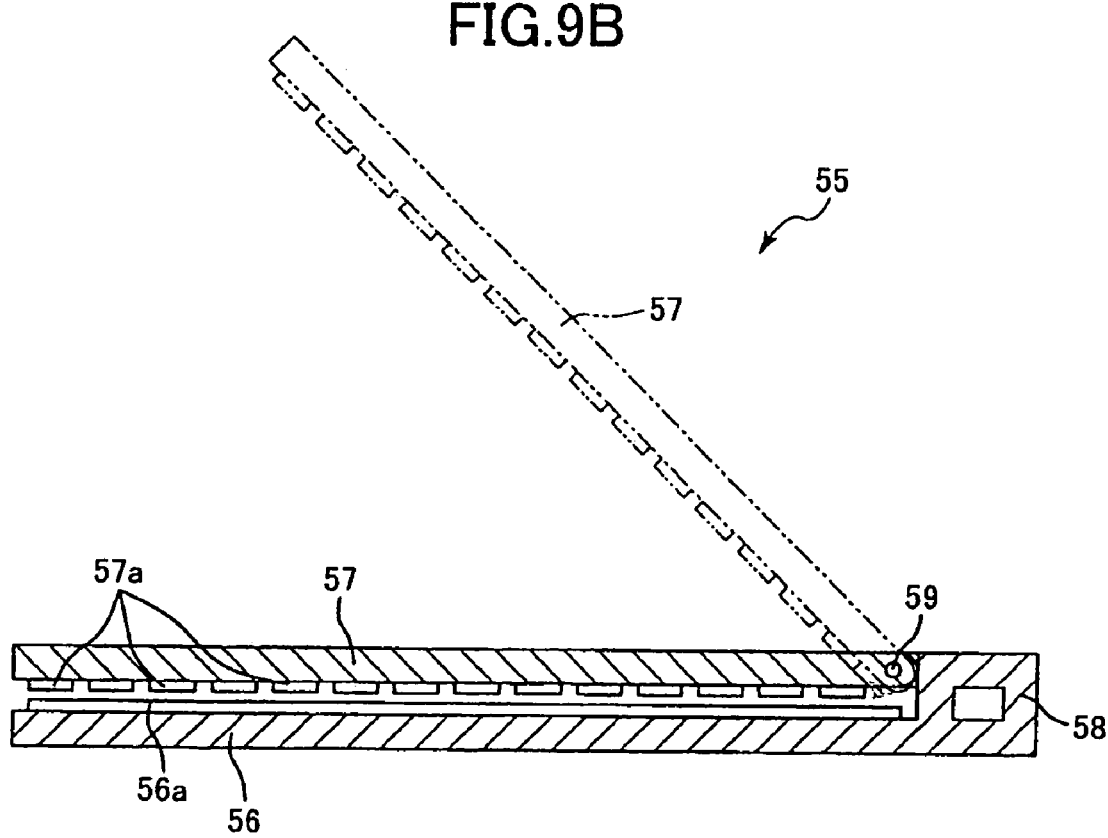
FIG. 9B is a cross-sectional view of a head member supported on the electronic notebook according to the fourth embodiment.

Next, an electronic notebook 300 according to a fourth embodiment of the present invention will be described. FIG. 9A is a perspective view showing the electronic notebook 300 according to the fourth embodiment, wherein like parts and components with the electronic notebook 200 of the third embodiment are designated with the same reference numerals to avoid duplicating description. FIG. 9B is a cross-sectional view showing a head member 55 mounted on the electronic notebook 300 according to the fourth embodiment.

In place of the head member 53 in the electronic notebook 200 according to the third embodiment, the electronic notebook 300 according to the fourth embodiment includes the head member 55 having two surfaces that confront each other across a prescribed gap. First electrodes 56a are formed on one surface of the head member 55, while second electrodes 57a are formed on the opposing surface. The electronic notebook 300 according to the fourth embodiment also includes a support substrate 60 in place of the support substrate 40 of the third embodiment. The support substrate 60 is formed slightly larger than the display media 7, 8, and 9. The display media 7, 8, and 9 are disposed between the two opposing surfaces of the head member 55.

The head member 55 includes a lower plate 56 having a surface on which the first electrodes 56a are formed, an upper plate 57 having a surface on which the second electrodes 57a are formed, and a spacer 58 erected from an end of the lower plate 56. A rotational shaft 59 is provided in the spacer 58. The upper plate 57 is rotatably supported on the rotational shaft 59. Hence, by rotating the upper plate 57 upward via the rotational shaft 59, the display media 7, 8, and 9 can be inserted between the upper plate 57 and lower plate 56.

Let us consider a case of forming a desired image on the display medium 7 using the electronic notebook 300 having this construction. First, the head member 55 is moved to one end of the guiding rod 52, and the upper plate 57 of the head member 55 is rotated upward. Next, the display medium 7 is laid over the lower plate 56, and the upper plate 57 is rotated downward so that a portion of the display medium 7 becomes interposed between the lower plate 56 and upper plate 57 of the head member 55. By applying a voltage across the first electrodes 56a and second electrodes 57a at this time, the white charged particles 15 and black charged particles 16 interposed between the electrodes migrate, as described with the electronic notebook 1 in the first embodiment, to display an image in the portion of the display medium 7 interposed between the electrodes. A desired image can be displayed on the display medium 7 by moving the head member 55 over the entire surface of the display medium 7.

According to the electronic notebook 300 of the fourth embodiment described above, the head member 55 enables the surface formed on not just one of the electrodes, as in the head member 53 according to the third embodiment, but both electrodes to be formed with a substantially uniform flatness, thereby maintaining a substantially uniform gap between both electrodes and the display media. Accordingly, it is possible to apply a substantially uniform electric field to the display media in order to display high-quality images. Further, the cost for the electrode material can also be reduced.

While the invention has been described in detail with reference to specific embodiments thereof, it would be apparent to those skilled in the art that many modifications and variations may be made therein without departing from the spirit of the invention, the scope of which is defined by the attached claims.

For example, the electronic notebook 1 and electronic notebook 100 according to the first and second embodiments described above may be configured so that the display media set 3 can be detachably mounted on the base plate 5, enabling the display media set 3 to be separated from the electrode member 4. The base plate 5 and frame 6 may also be detachably mounted to each other so that the display media set 3 and electrode member 4 can be separated. Further, by configuring the electrode member 4 to be detachably mounted on the frame 6, the display media set 3 and electrode member 4 can be separated. Similarly, the electronic notebook 200 and electronic notebook 300 according to the third and fourth embodiments described above may be configured so that the display media set 3 is detachably mounted on the support substrate 40 and support substrate 60, respectively. In this way, the display media set 3 can be separated from the first substrate 10 and from the head member 53 and head member 55, respectively.

By making it possible to separate the display media set 3 and electrode member 4 in this way, the display media set 3 and electrode member 4 can be replaced with a different display media set 3 or electrode member 4. For example, by replacing the display media set 3 with another display media set 3, it is possible to save the images displayed on all the display media 7, 8, and 9 and to display and save additional images. Further, by replacing the electrode member 4 with another electrode member 4, it is possible to replace the electrode member 4 alone when an irreparable malfunction occurs in the electrode member 4 while the display media set 3 is still functioning properly.

Further, while the film 12 is provided only on one surface of the display medium 7 in the preferred embodiments described above, the film 12 may be provided on the display surface of the display medium 7 as well, provided that the film 12 is formed of a transparent polyethylene film or PET film. However, if the film is too thick, the display medium 7 will not only lose flexibility, but will reduce the actual electric field applied to the display area for the applied voltage. Hence, when a film is provided on the display surface, it is preferable that the thickness of the film be no greater than 0.025 mm.

Figure 10:
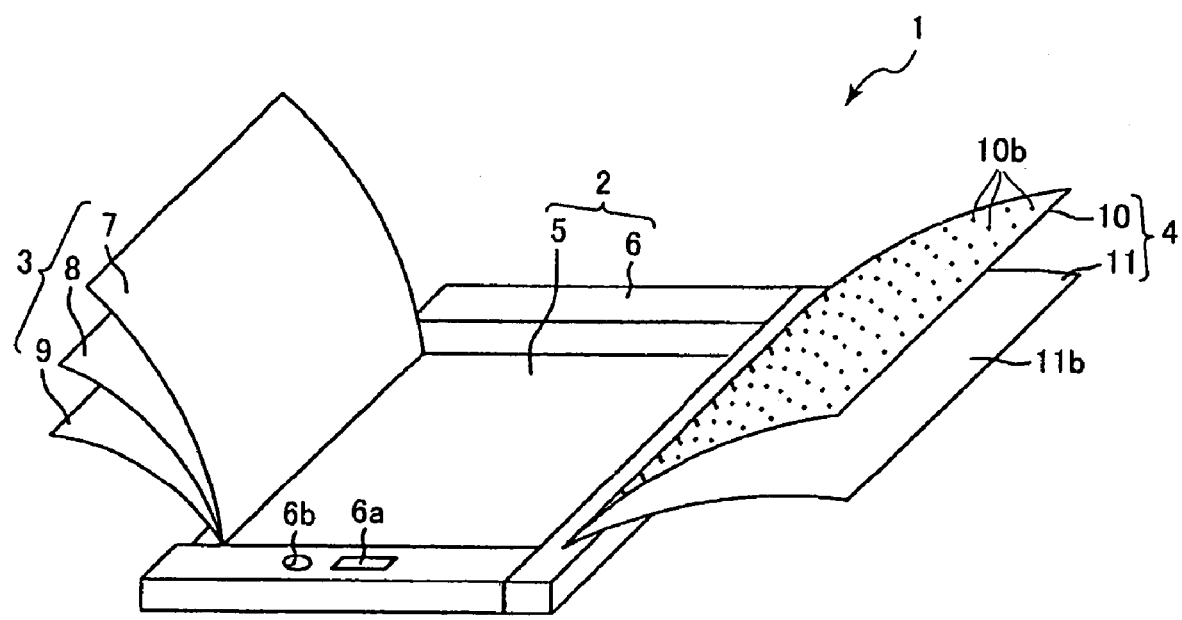
FIG. 10 is a perspective view showing a variation of the electronic notebook using TFT electrodes.

In the preferred embodiments described above, the first electrodes 10a and second electrodes 11a are line-shaped. However, as shown in FIG. 10, the first electrodes 10a may be replaced by individual electrodes 10b configured of thin film transistors (TFT), while the second electrodes 11a may be replaced with a grounded common electrode 11b. A plurality of the individual electrodes 10b is provided on the first substrate 10, and the control unit 25 is capable of applying a desired voltage to each of the individual electrodes 10b. The common electrode 11b, on the other hand, is provided across the entire second substrate 11 and is grounded.

With this construction, a positive voltage applied to the individual electrodes 10b generates an electric field from the individual electrodes 10b toward the common electrode 11b. Applying a negative voltage to the individual electrodes 10b produces an electric field from the common electrode 11b toward the individual electrodes 10b. By applying a prescribed voltage to each of the individual electrodes 10b, the common electrode 11b can display a desired image on the display media 7, 8, and 9 interposed between the individual electrodes 10b and the common electrode 11b. Since the common electrode 11b is formed over the entire surface of the second substrate 11 in this way, the positions of the corresponding individual electrodes 10b form the pixels. Hence, since the number of pixels can be increased simply by increasing the number of individual electrodes 10b, it is possible to display images with even higher quality.

Further, in the electronic notebook 1 and electronic notebook 100 of the first and second embodiments described above, a transparent pressing member may be placed on top of the second substrate 11 after the display medium 7 and the like are interposed between the first substrate 10 and second substrate 11 for pressing the second substrate 11 toward the base plate 5.

By providing such a pressing member to press the second substrate 11 toward the display medium 7 and the like, it is possible to apply a uniform electric field to the display medium 7 and the like. Accordingly, high-quality images can be displayed.

Further, in the electronic notebook 200 and electronic notebook 300 according to the third and fourth embodiments described above, the head members 53 and 55 reciprocates along the longitudinal direction of the display medium 7 and the like. However, the reciprocating direction of the head members 53 and 55 is not limited to this longitudinal direction. For example, the guiding rod 52 may be provided along a direction orthogonal to this longitudinal direction so that the head members 53 and 55 can reciprocate in this direction along the guiding rod 52.

Further, the head member 53 and head member 55 according to the third and fourth embodiments, respectively, may be rotatably disposed. With this construction, the standby position for the head member 53 can be eliminated from the support substrate 40, making the overall device more compact.

What is claimed is:

1. An electronic notebook comprising:
a case; a sheet-like display medium disposed on the case, containing charged particles, and having a first surface and a second surface;
a first electrode disposed on the case; and
a second electrode disposed on the case,
wherein by changing a positional relationship between the display medium and the first electrode and the second electrode, the display medium and the first electrode and the second electrode take on either an arranged state in which the display medium is interposed between the first electrode and the second electrode so that the first surface of the display medium opposes the first electrode and the second surface of the display medium opposes the second electrode, or a non-arranged state where the display medium is not interposed between the first electrode and the second electrode; and
wherein at least one electrode is formed on a sheet-like substrate.

2. The electronic notebook according to claim 1, wherein the display medium includes a plurality of display media, wherein each display medium is interposed between the first electrode and the second electrode in the arranged state so that the first surface of each display medium opposes the first electrode and the second surface of each display medium opposes the second electrode.

3. The electronic notebook according to claim 2, wherein the case includes a medium support member that supports ends of all the plurality of display media.

4. The electronic notebook according to claim 1, wherein the first electrode is formed on a sheet-like first substrate and the second electrode is formed on a sheet-like second substrate.

5. The electronic notebook according to claim 1, further comprising a control unit that controls electronic signals applied to the first electrode and the second electrode.

6. The electronic notebook according to claim 4, wherein the first electrodes are formed on the first substrate and are in line shape extending along a first direction, and the second electrodes are formed on the second substrate and are in line shape extending along a second direction different from the first direction.

7. The electronic notebook according to claim 4, wherein the first electrode is configured of a common electrode disposed over a prescribed region on the first substrate, and the second electrodes are configured of individual electrodes formed at a plurality of locations within a region on the second substrate corresponding to the prescribed region on the first substrate.

8. The electronic notebook according to claim 4, wherein the case includes a substrate support member that supports an end of the first substrate and an end of the second substrate so that the first electrode opposes the second electrode.

9. The electronic notebook according to claim 4, wherein the case includes a substrate support member formed substantially rectangular in shape that supports an end of the first substrate along one edge of the substrate support member and an end of the second substrate along another edge of the substrate support member.

10. The electronic notebook according to claim 1, further comprising:
a sheet-like electrode substrate on which the first electrode is formed; a head member having a surface opposing the electrode substrate on which the second electrode is formed; and a moving part that moves the head member along a surface of the electrode substrate on which the first electrode is formed, wherein the display medium is interposed between the first electrode and the second electrode.

11. The electronic notebook according to claim 1, wherein the display medium, the first electrode, and the second electrode are detachably mounted on the case.

* * * * *